United States Patent [19]

Dunstan et al.

[11] 4,276,976

[45] Jul. 7, 1981

[54] ACCELERATING AND DECELERATING MOVING WALKWAY WITH MINIMAL WALKWAY SURFACE IRREGULARITIES

[75] Inventors: Phillip E. Dunstan; Charles H. McConnell, both of Seattle, Wash.

[73] Assignee: The Boeing Company, Seattle, Wash.

[21] Appl. No.: 926,336

[22] Filed: Jul. 20, 1978

[51] Int. Cl.[3] .............................................. B65G 23/00

[52] U.S. Cl. ...................................... 198/334; 198/792

[58] Field of Search ............... 198/334, 792, 325, 333, 198/327; 104/25

[56] References Cited

U.S. PATENT DOCUMENTS

| | | | |
|---|---|---|---|
| 3,489,260 | 1/1970 | Hara et al. | 104/25 X |
| 3,687,257 | 8/1972 | Johnson | 198/325 |
| 3,712,448 | 1/1973 | Burson et al. | 198/334 |
| 3,735,851 | 5/1973 | Patin | 198/334 |
| 3,939,959 | 2/1976 | Dunstan et al. | 198/334 |

FOREIGN PATENT DOCUMENTS

| | | | |
|---|---|---|---|
| 624607 | 11/1962 | Belgium | 198/792 |

*Primary Examiner*—Joseph E. Valenza
*Assistant Examiner*—Douglas D. Watts
*Attorney, Agent, or Firm*—Christensen, O'Connor, Johnson & Kindness

[57] ABSTRACT

An accelerating and decelerating moving walkway, including a plurality of overlapping platforms formed such that walkway surface irregularities are minimized and such that the platforms change direction in a minimal amount of space, is disclosed. Each platform includes a pallet and a tapered, trailing edge flap. The underside of the flaps are combed and mesh with the combed upperside of the platform that they overlap. Each flap is hinged to its associated pallet in a manner that allows only a limited amount of rotation. Surface irregularities, which occur primarily when the overlapping platforms are stretched out in the constant speed zone, are minimized by convexly contouring the upper surface of the pallets in the direction of platform overlap; and, by controlling the rotation of the flaps so that contact is maintained between the flaps and the platforms they overlie. In regions where changes in the direction of platform movement occur, adjacent platforms are first separated, so that they no longer mesh and, then, are turned. After being turned, the platforms are realigned and brought back together. Separation, turning, and realigning the platforms is controlled by a trailing edge guide mechanism. The trailing edge guide mechanism includes platform support arms, attached to the rear of the outer edge of each pallet, and guide rails located around the outer periphery of the change-of-direction regions. The support arms engage the guide rail and, as the platforms are slightly accelerated, support the rear edge of the related platforms so that they are separated from the platforms they overlap. After turning and realignment, the platforms are joined and decelerated slightly.

32 Claims, 18 Drawing Figures

ACCELERATING AND DECELERATING MOVING WALKWAY WITH MINIMAL WALKWAY SURFACE IRREGULARITIES

BACKGROUND OF THE INVENTION

This invention is directed to moving walkways and, more particularly, to accelerating and decelerating moving walkways that include a plurality of overlapping platforms.

In the past, a wide variety of moving walkways, some with and some without accelerating and decelerating zones, have been proposed. One moving walkway that includes accelerating and decelerating zones is described in U.S. Pat. No. 3,939,959, entitled "Accelerating and Decelerating Moving Walkway" by Phillip Dunstan et al. The accelerating and decelerating moving walkway described in U.S. Pat. No. 3,939,959 includes a plurality of interconnected overlapping platforms movable in a closed-loop, substantially planar, horizontal path of travel having lengthy sides joined by curved ends.

The platforms described in U.S. Pat. No. 3,939,959 have generally planar upper and lower surfaces with the exception that the rear edge tapers to a featheredge. In other words, the platforms have a trapezoidal longitudinal cross-sectional configuration. The upper surface of each platform is combed and meshes with the combed bottom surface of a rotatable plate pinned to the bottom surface of the preceding platform, near its rear edge. Although the accelerating and decelerating walkway described in U.S. Pat. No. 3,939,959 (and especially the apparatus for controlling the acceleration and deceleration of the moving walkway) is a significant advance in the art, the disclosed platform design is not completely adequate in all environments. For example, in constant speed zones, where platform overlap is at a minimum, the upper surfaces of adjacent platforms do not lie in substantially the same plane. Rather, in the constant speed zones, the upper surfaces have a height variation equal to the thickness of one platform plus a rotatable plate. Although the tapered trailing edge of the platforms provides a transitional surface between the irregular upper surfaces of adjacent platforms, the transition is somewhat abrupt. As a result, passengers who change position on the moving walkway face a stumbling hazard.

In addition to the foregoing disadvantage, the way the rotatable plates are attached to the platforms of the walkway described in U.S. Pat. No. 3,939,959, is such that regions in which pinching or catching can occur are created. More specifically, because a platform and is related rotatable plate are pinned, the rotatable plates are free to rotate relative to the platforms, whereby the upper surfaces of the plates, which are combed, can become misaligned with the upper surfaces of their related platforms, which are also combed. This comb misalignment creates regions wherein pinching or catching can occur. A similar problem exists at entrance and exit comb plates, where passengers board and alight from the walkway. More specifically, entrance and exit comb plates overlie the platforms and mesh with the combed upper surfaces of the platforms. A misaligned rotatable plate will also be misaligned with the entrance and exit comb plates. As a result of this misalignment, the potential for pinching and catching passengers or their clothing exists. In addition, misalignment of a rotatable plate could prevent the rotatable plate from meshing with an exit comb plate, resulting in equipment failure.

Another disadvantage of the platform mechanism described in U.S. Pat. No. 3,939,959 relates to the relatively large turning radius required to change the direction of the moving platforms. More specifically, U.S. Pat. No. 3,939,959 discloses a track for guiding wheels located at the front edge of each platform around a semicircular path in the regions where platform direction changes take place. As the platforms change direction, the rotatable plates rotate relative to their respective platforms. Because of the way the plates rotate, and because platform overlap is at a maximum in the change of direction regions, a large turning radius is needed in order to avoid interference between adjacent, stacked platforms. Because a large turning radius is required, the entire closed-loop, accelerating and decelerating moving walkway described in U.S. Pat. No. 3,939,959 can only be installed in relatively wide corridors.

Therefore, it is an object of this invention to provide a new and improved accelerating and decelerating moving walkway.

It is another object of this invention to provide an accelerating and decelerating moving walkway having a minimal amount of upper surface irregularity.

It is a further object of this invention to provide a combed surface, overlapping platform, accelerating and decelerating moving walkway designed such that lateral misalignment of the platforms is prevented in regions where passengers or freight are transported.

It is a still further object of this invention to provide an accelerating and decelerating moving walkway having a substantially flat, continuous upper surface and the ability to change directions, particularly reverse directions, in a minimal amount of horizontal space.

It is yet another object of this invention to provide a new and improved accelerating and decelerating moving walkway that is suitable for being entirely installed in relatively narrow corridors.

SUMMARY OF THE INVENTION

In accordance with this invention an improved accelerating and decelerating moving walkway is provided. The complete walkway includes: a plurality of overlapping platforms; a mechanism for defining the path-of-travel of the overlapping platforms; a mechanism for controlling the amount of overlap between adjacent platforms; a mechanism for driving the plurality of overlapping platforms about the path-of-travel; and, a mechanism for changing the direction of the plurality of overlapping platforms. In accordance with this invention, each platform comprises a pallet and a tapered, trailing edge flap. The pallets are longitudinally, convexly contoured. The upper and lower surfaces of the platforms are configured such that the platforms mesh in a manner that prevents lateral misalignment when overlapping platforms impinge on one another. The mechanism for defining the platform path-of-travel guides the plurality of platforms along two paths that lie in substantially the same plane. The paths, may, for example, define a closed-loop that lies in a substantially horizontal plane. Regardless of the specific nature of the path-of-travel, linear paths are joined by change-of-direction regions. The mechanisms for changing the direction of platform travel include a trailing edge guide that surrounds the region wherein the change-of-direction is to take place and a guide follower attached to the outer side of each platform, near its trailing edge. As the platforms enter a region where a change-of-direction is to take place, the guide followers and the trailing edge guide coact to support the trailing edge of an associated platform. After the trailing edge of a platform is so supported, the platform is slightly accelerated, whereby it is separated from the immediately following platform. After the platforms have been guided through the change-of-direction region, they are realigned and decelerated slightly. As the platforms are decelerated they rejoin one another.

In accordance with other aspects of this invention, the flaps are rotatably attached to the rear end of their associated pallet. The amount of flap rotation is limited and flap mounting is such that the featheredge of the flaps always remains in contact with the upper surface of the platform that a particular flap overlaps. As a result, passenger and clothing catching apertures are not created.

In accordance with further aspects of this invention, meshing of the platforms is created by forming combed regions in the upper surface of the pallets and in the upper and lower surfaces of the flaps. The combing is positioned such that overlapping combed regions mesh so as to maintain lateral alignment between adjacent platforms.

In accordance with still further aspects of this invention, the walkway includes an entrance and exit comb plates, mounted above the plurality of overlapping platforms at the end and the beginning of the regions where the platforms change direction. Further, flap size and angle of taper are chosen such that, when platform overlap is a maximum, which occurs at the entrance and exit comb plates, adjacent flaps partially overlap one another and form a continuous planar, upper surface. While continuous, the upper surface is combed and the combs mesh with combed tips formed in the ends of the entrance and exit combed plates. That is, the under surface of the tips of the entrance and exit combed plates are combed. The tip combing meshes with the combing in the upper surface of the flaps.

In accordance with yet other aspects of this invention, preferably, each pallet is formed of a plurality of juxtaposed segments. The segments are affixed together by welding, for example. In addition, each flap is formed of a plurality of flap sections, each of which is independently hinged to a related pallet segment for vertical movement. Further, each flap section houses a comb block. The comb blocks are mounted in apertures formed in the lower surface of the flap sections. The lower surfaces of the comb blocks are combined and mesh with the combed upper surface of the platform that their associated flap section overlaps.

It will be appreciated from the foregoing brief summary that the invention provides a new and improved accelerating and decelerating moving walkway. Convexly contouring the upper surface of the platforms and allowing the platforms to mesh in the regions where passengers or freight are carried, in a manner that prevents lateral misalignment, eliminates the pinching, catching and irregularity problems of prior art walkways, generally discussed above. This result is further enhanced by forming the platforms of pallets and rotatable flaps attached to the trailing edge of the pallets. Movement of the flaps allows the trailing edges of the flaps to maintain continuous contact with the platforms that the flaps overlap. In addition, because adjacent platforms are separated before they are turned, the platforms can be turned about a radius that is sufficiently small to allow an entire moving walkway formed in accordance with the invention to be installed in relatively narrow corridors.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
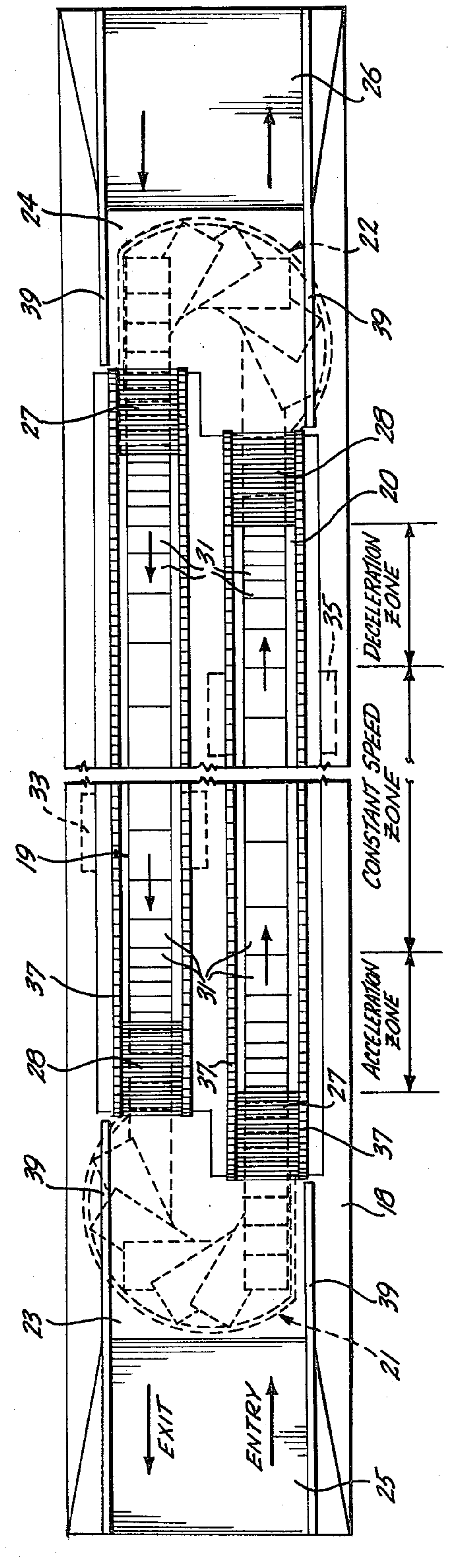
FIG. 1 is a top plan view of an accelerating and decelerating moving walkway that includes platforms that overlap by varying amounts, depending upon the particular zone in which a particular platform is located.
Figure 2:
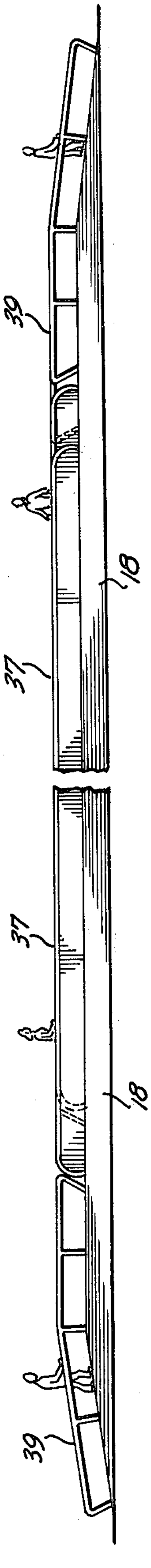
FIG. 2 is a side elevational view of the accelerating and decelerating moving walkway illustrated in FIG. 1.

FIGS. 1 and 2 illustrate a moving walkway generally similar to the type described in U.S. Pat. No. 3,939,959 and comprises a plurality of platforms 31 moving in a substantially horizontal planar path-of-travel inside of a housing 18. The substantially horizontal planar path-of-travel includes two parallel linear regions 19 and 20 connected by semicircular change-of-direction regions 21 and 22 wherein the platforms reverse directions. Thus, the path-of-travel is a closed-loop. The platform change-of-direction regions 21 and 22 are covered by covers 23 and 24, which form part of the housing 18.

Short ramps 25 and 26 lead up to and down from the covers 23 and 24. Each linear region 19 and 20 is broken into three zones—an acceleration zone; a constant speed zone; and, a deceleration zone. The platforms move through these zones from left to right in the lower linear region 20, as viewed in FIG. 1 and vice versa (i.e., right to left) in the upper linear region 19, also as viewed in FIG. 1. As will be readily appreciated from the previous description and from viewing FIG. 1, if the accelerating and decelerating moving walkway illustrated in FIG. 1 is mounted in a corridor, the accelerating and decelerating moving walkway provides a system adapted to move passengers and freight bidirectionally.

The platforms 31 move continuously along the path-of-travel as long as power is applied to a drive system. Preferably, the drive system comprises two drive units 33 and 35, one located in each of the constant speed zones. Thus, the platforms are continuously passing through the two acceleration zones, the two constant speed zones, the two deceleration zones, and through the platform change-of-direction regions 21 and 22. Each end of the moving walkway illustrated in FIG. 1 includes an entry region and an exit region. Entry is into the acceleration zones via an entrance comb plate 27 and exit is from the deceleration zones via an exit comb plate 28. The entrance and exit comb plates form part of the covers 23 and 24. More specifically, an entrance comb plate 27 and an exit comb plate 28 are integral parts of each of the covers 23 and 24. The entrance and exit comb plates overlie the platforms at the beginning of the acceleration zone and at the end of the deceleration zones, respectively. People desiring to use the walkway, (or freight to be transported by the walkway), enter the linear region 20 of the track, illustrated in the lower portion of FIG. 1, from the left and exit from the right, as illustrated by the arrows. Consequently, the entrance comb plate 27 for the lower linear region 20 is on the left and the exit comb plate 28 is on the right. Contrariwise, for the upper linear region 19, passengers or freight enter from the right and exit from the left, as also illustrated by the arrows. Thus, for the upper linear region of the track, the entry comb plate 27 is on the right and the exit comb plate 28 is on the left.

Preferably, as best illustrated in FIG. 2, accelerating and decelerating handrails 37 are located along both edges of both of the parallel linear regions 19 and 20 of the path-of-travel of the moving walkway. Since the accelerating and decelerating handrails form no part of the present invention, they are not further described herein. Attention, however, is directed to U.S. patent application, Ser. No. 897,263, filed Apr. 18, 1978 for "Accelerating and Decelerating Moving Handrail" by Phillip E. Dunstan, for a description of an accelerating and decelerating handrail suitable for use with the present invention. In addition to the accelerating and decelerating moving handrails, siderails 39, located on either side of the ramps 25 and 26 and the covers 23 and 24, may be included if desired. Preferably, the side handrails are aligned with the outer accelerating and decelerating handrails.

The present invention provides an improved walkway of the general type described in U.S. Pat. No. 3,939,959. The major areas of improvement lie in the structure of the platforms and in the mechanism for guiding the platforms in the change-of-direction regions 21 and 22. In order to best understand these improvements, an understanding of the mechanism for controlling the acceleration and deceleration of the platforms is needed. Consequently, a brief description of the platform acceleration and deceleration control mechanism is first set forth, reference being made to U.S. Pat. No. 3,939,959 for a more complete description of the acceleration and deceleration control mechanism.

Figure 3:
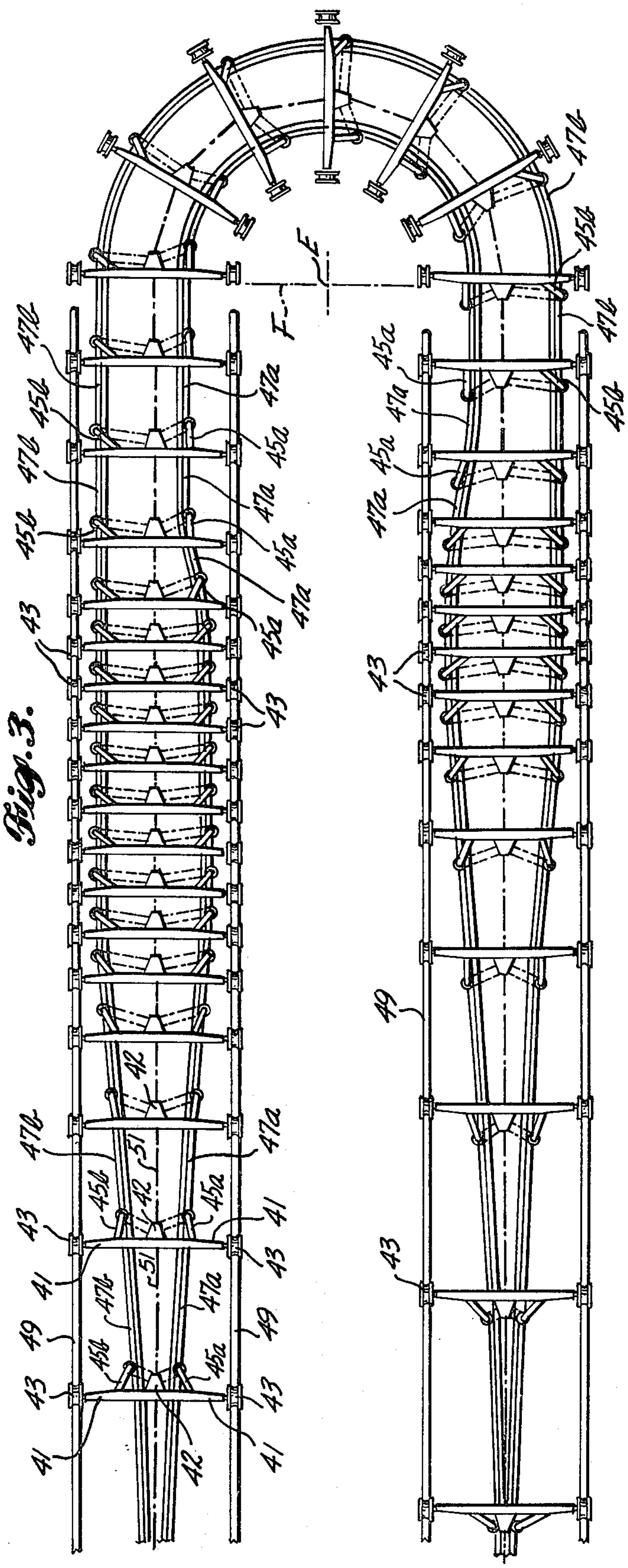
FIG. 3 is a top plan view showing the mechanism for controlling the amount of platform overlap in a region where platforms change direction.
Figure 5:
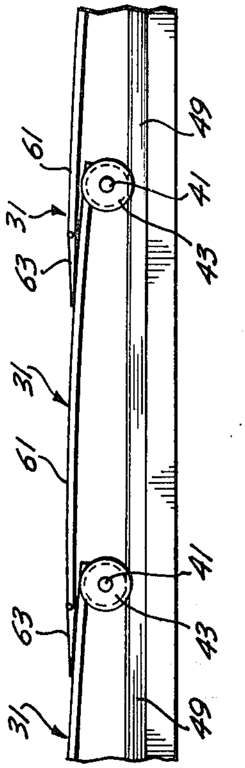
FIG. 5 is a cross-sectional view along line 5—5 of FIG. 4.
Figure 9:
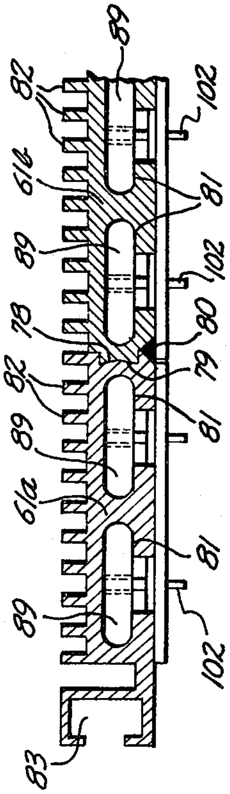
FIG. 9 is a cross-sectional view of a part of a platform pallet.

Turning to FIGS. 3 and 5, an axle 41 is located beneath the leading edge of each platform 31. Rotatably mounted on the ends of each axle 41 are wheels 43, which follow parallel tracks 49 located in the linear regions 19 and 20 of the path-of-travel of the platforms. The trailing edge of each platform is supported by, and slides on, the upper surface of the immediately following platform. Thus, the leading edge of each platform is supported by the axle 41 and the wheels 43, and the trailing edge of each platform is supported by the following platform.

One end of one of a pair of cam follower arms **45*a* and 45*b* is rotatably attached to each axle between the midpoint of the axle and the end of the axle. The axis of rotation of the cam follower arms is perpendicular to the horizontal plane of the path-of-travel of the platforms 31. The cam follower arms 45*a* and 45*b* extend outwardly from the axle 41 in a direction opposite to the direction of movement of the platforms 31**, i.e., the cam follower arms trail the axles. Extending downwardly from the outer ends of the cam follower arms are cam followers.

Located beneath the axles 41 and the cam follower arms **45*a* and 45*b*, on opposite sides of the centerline of the path-of-travel of the platforms, are a pair of elongate (strip) cams 47*a* and 47*b*. In the direction of platform movement, the elongate cams 47*a* and 47*b* converge in the acceleration zones and diverge in the deceleration zones. If desired, the cams may be dispensed with in the constant speed zones; or, they may lie parallel to one another near the centerline of the path-of-travel. The cam followers extending downwardly from the outer ends of the cam follower arms impinge on the outer face of the elongate cams 47*a* and 47*b***.

An extendable and retractable member 51, such as a separate chain or cable, interconnects each platform with the immediately following platform. Each extendable and retractable member wraps around pulleys or sheaves located on the outer ends of the cam follower arms **45*a* and 45*b* and on flanges 42 mounted on the midpoints of the axles 41. More specifically, each extendable and retractable member 51 starts at the flange 42 of one platform; extends rearwardly and wraps around a sheave located on the flange 42 of the following platforms; extends outwardly and wraps around the sheave located on the end of one of the cam follower arms 45*b*; extends inwardly and wraps around a second sheave located on the flange 42 of the same axle; extends outwardly and wraps around the sheave located on the outer end of the other cam follower arm 45*a*; and, returns inwardly to the flange on the same axle, where it terminates. As a result, the length of the extendable and retractable member running between adjacent platforms is controlled by the position of the cam follower arms. More specifically, as the platforms approach a deceleration zone, whereat the cams 47*a* and 47*b*** diverge from the centerline of the platform path-of-travel, the cam follower arms are forced to move away from the centerline of the path-of-travel, whereby the length of the extendable and retractable member connecting adjacent platforms decreases, and the amount of platform overlap increases. In the acceleration regions, the cams start in a spaced apart position and converge toward the centerline of the path-of-travel. Consequently, the cam follower arms move toward the centerline of the path-of-travel in the acceleration zones, whereby the length of the extendable and retractable member running between adjacent platforms increases and the amount of platform overlap decreases. Because platform overlap increases in the deceleration zones, a relative deceleration of objects, (e.g., people or freight) carried by the walkway occurs in these zones. Contrariwise because a decrease in platform overlap occurs in the acceleration zones, a relative acceleration occurs. As noted above, reference is made to U.S. Pat. No. 3,939,959 for a more detailed description of the foregoing interconnection system and its manner of operation. As is necessary, the description contained in U.S. Pat. No. 3,939,959 is hereby incorporated by reference into this application.

Platforms 31 formed in accordance with the present invention minimize exposed surface irregularities so that a substantially flat, continuous platform surface is presented to passengers and freight. More specifically, as illustrated in FIGS. 4–7, platforms 31 formed in accordance with the invention comprise two major elements—a pallet 61 and a flap 63. The flaps 63 are rotatably attached to the trailing edges of the pallets 61. The axis of rotation of the flaps lies in the plane of the path of travel of the platforms, orthogonal to the direction of movement. The lower surfaces of the flaps 63 provide the majority area of support for the trailing edges of the platforms 31. As will be better understood from the following discussion of a preferred embodiment of a platform formed in accordance with the invention, the upper surfaces of both the pallets 61 and the flaps 63, and the lower surface of the flaps, are combed, i.e., include parallel ribs. The comb axes run parallel to the direction of travel of the platforms in the linear regions 19 and 20. The combed lower surface of the flaps mesh with the combed upper surface of the pallets and the flaps to maintain lateral alignment between adjacent platforms in the regions where the platforms move linearly. In addition, the combed upper surface of the platforms (in particular the combed upper surface of the flaps) mesh with teeth projecting downwardly from the tips of the entrance and exit comb plates 27 and 28. More specifically, as with conventional escalators, the tips of the comb plates 27 and 28 include downwardly projecting teeth. These teeth mesh with the exposed upper surface of the flaps as the platforms move beneath the teeth. That is, as will be better understood from the following discussion, the only surface of the platforms exposed to the teeth of the comb plates is the upper surface of the flaps. Thus, only the upper surface of the flaps actually mesh with the teeth of the entrance and exit comb plates. Moreover, the shape of the flap and the extent of overlap of the platforms in this region provide a substantially planar, continuous upper walkway surface at the comb plates 27 and 28.

Figures 4, 6, 18:
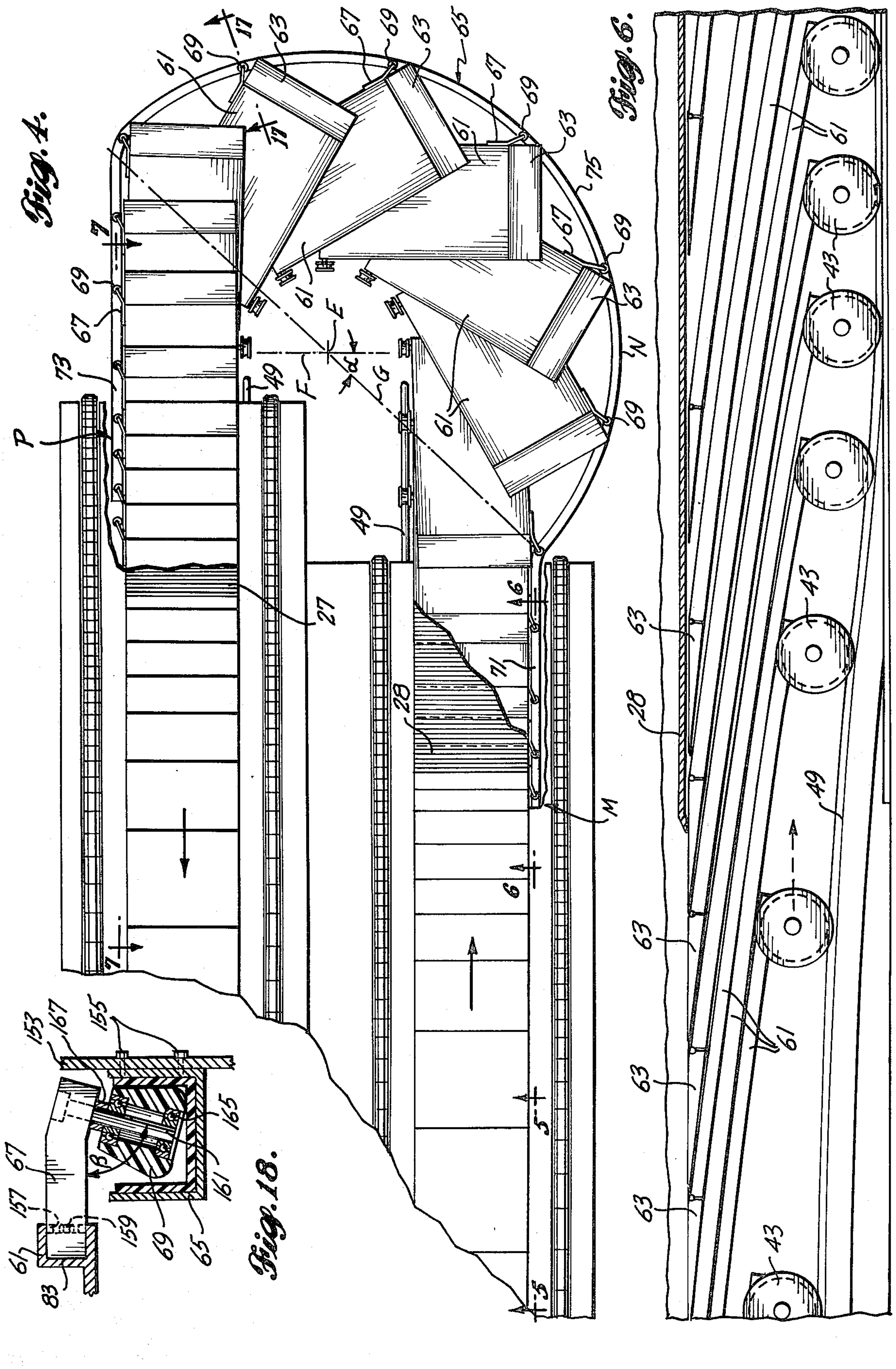
FIG. 4 is a top plan view, partially broken away, of the region of a moving walkway formed in accordance with the invention where platforms change direction.
FIG. 6 is a cross-sectional view along lines 6—6 of FIG. 4.
Figure 7:
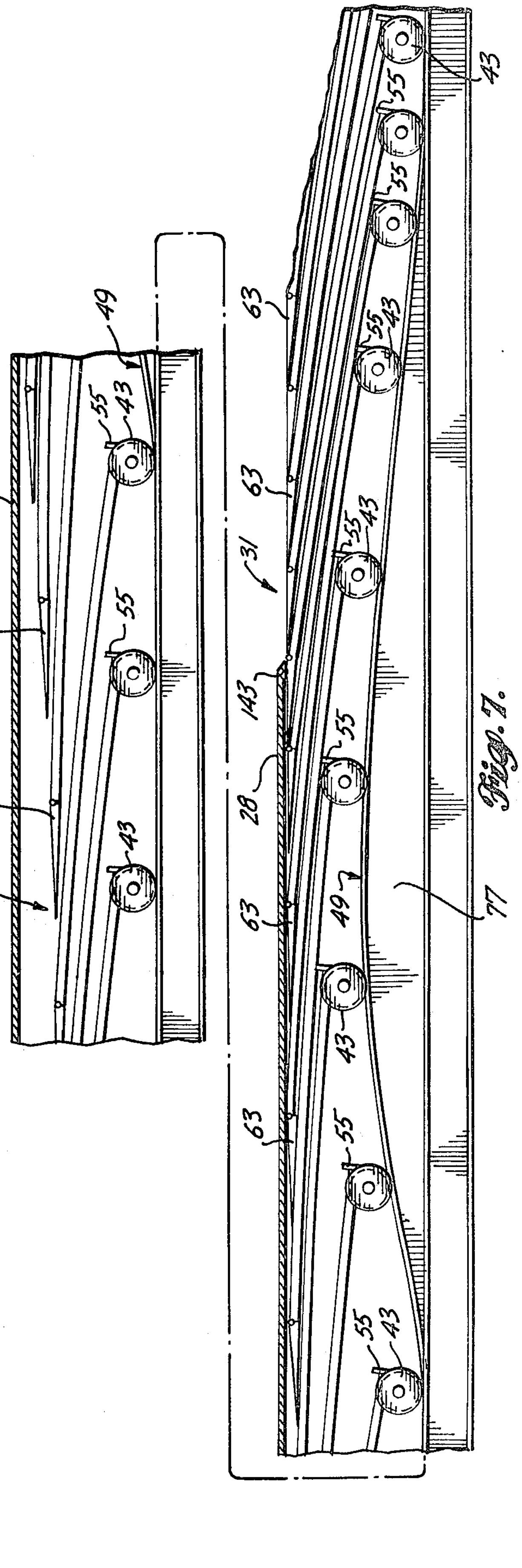
FIG. 7 is a cross-sectional view along lines 7—7 of FIG. 4.

As best illustrated in FIGS. 5–7, the upper surface of each pallet is longitudinally, convexly curved from its leading edge to its trailing edge. Preferably, the lower surface of the pallets follows the curvature of the upper surface; and, the radius of curvature of the crown of the platform is vertically higher than the chord running between the leading and trailing edges of the platform by a distance that approximately equals the thickness of the pallet. The platforms are formed in this manner so as to be substantially faired together throughout the acceleration, deceleration and constant speed zones. Furthermore, the contoured pallets permit the platforms to be more easily stacked and unstacked in the acceleration and deceleration zones.

It is the flap/pallet platform arrangement in combination with the convexly curved pallets that substantially eliminates surface irregularities. More specifically, when the platforms 31 are in the constant speed zones (see FIG. 5), each tapered flap 63 contacts the succeeding platform near its front edge. This region of the succeeding platform declines because the front edge of each platform 31 is lower than its longitudinal midpoint (e.g., its crown) by a distance equal to the thickness of a pallet, as discussed above. The flaps 63 (which taper from a featheredge to a thickness generally equal to the thickness of a platform, where the flap joins the platform) provides a smooth transition between adjacent pallets 61. As a result, the portion of the upper surface of the platforms that is exposed to passengers or freight is substantially flat, albeit combed. As the amount of platform overlap changes in the acceleration and deceleration zones, the flaps 63 rotate and maintain contact with the upper surface of the following platform. As a result, the surface irregularity previously associated with a moving walkway formed of overlapping platforms are minimized and virtually no stumbling hazard is presented to passengers.

As noted above, adjacent platforms are slidably meshed together by the combed upper and lower surfaces of the pallets and flaps. While such meshing prevents lateral misalignment, it also prevents the platforms from changing direction by a substantial amount. (If desired, the meshing can be designed to allow some minimal direction change so that the path of the walkway may deviate from a straight line between change-of-direction regions). As a result, it is necessary that the platforms be separated prior to a substantial directional change taking place. It is, of course, also necessary that the separated platforms be guided through the change-of-direction regions. A trailing edge guide mechanism that coacts with the shape of the track 49 and the shape of the elongate cams **47*a* and 47*b* to achieve these results is illustrated in FIG. 4**.

The trailing edge guide mechanism comprises two main elements: a guide rail 65 surrounding each change-of-direction region; and, a series of guide followers one mounted on each pallet 61. More specifically, each guide follower includes a support arm 67 and a roller/slide 69. The guide arms, when viewed from above, have a dog-leg shape. One of the legs of each support arm 67 is attached to the outer peripheral edge of its associated pallet, near the trailing edge of the pallet i.e., just in front of the flap. Located at the outer end of the other leg of the support arm 67 is the roller/slide 69. As will be better understood from the following discussion, the roller/slide is supported by, and moves in, the guide rails 65. A preferred embodiment of a roller/slide is illustrated in FIG. 18 and hereinafter described.

As illustrated in FIG. 4, the guide rails 65 include three distinct sections—two linear sections 71 and 73; and, a semicircular section 75. One linear section 71 is positioned beneath the entrance comb plate 28 alongside of the outer edge of the platforms and the other linear section 73 is located beneath the exit comb plate 27 alongside the outer edge of the platforms. The semicircular section 75 connects the two linear sections 71 and 73. The linear sections 71 and 73 are longitudinally offset, whereby, when viewed from above, the guide rails 65 are P-shaped, rather than U-shaped. More specifically, the diagonal G of the semicircular section 75 does not lie orthogonal to the longitudinal axes of the linear sections 71 and 73. Rather, the diagonal G is angularly offset from an orthogonal line running between the two linear sections 71 and 73 (in a clockwise direction when viewed from above) by an angle $\delta$ of approximately 45°. Moreover, the length of the diagonal G of the semicircular section 75 is greater than the orthogonal separation distance between the linear sections 71 and 73. In addition, preferably, the inner wheels 43 of the platforms move through a semicircle having a center E. The diagonal F of this "inner semicircle" lies orthogonal to the linear sections 71 and 73 of the guide rail 65. Thus, the diagonal diameter G of the semicircular section 75 of the guide rail is offset from diagonal F by the angle $\delta$.

Still referring to FIG 4, the guide rail 65 is at a constant vertical height from the beginning of the first linear section 71 (point "M") to a point designated "N" in the semicircular section 75. Point N lies approximately on the extension of diagonal F that intersects the semicircular section 75. The guide rail 65 then steadily declines to the point designated "P" lying near the end of the other linear section 73 so that the platforms are properly oriented as the wheels of the platforms raise up an incline on a hump 77 in the track 49 (FIG. 7). Following this hump, the track 49 rises to a fixed level (not shown in the drawings), which is maintained in the constant speed zones. Contrariwise, the track merely declines as the platforms enter the acceleration zone 21 as shown in FIG. 6.

In operation, as a platform approaches and moves under an exit comb plate 28, its associated roller/slide enters the linear section 71 of the guide rail lying beneath the exit comb plate. As a result, the guide rail via the support arms starts to support the trailing edge of the platform. In this same region, as noted above, the tracks 49 on which the wheels ride declined downwardly. This declination compensates for the increased amount of platform overlap, which tends to raise the trailing edge of the platform as they reach the exit comb plate.

In order to separate a platform after its roller/slide has entered a guide rail, it is necessary to slightly accelerate the platform. More specifically, even though the trailing edge of a platform is supported by a guide follower, separation will not occur if the speed of the platforms remains constant. Contrariwise, if the platforms are accelerated by a slight amount, the trailing edge of a supported platform will move toward the leading edge of the support platform, whereby, it will become separated from the supporting platform, as illustrated on the right side of FIG. 6.

As discussed above, platform acceleration and deceleration is controlled by elongate cams **47*a* and 47*b* acting in conjunction with the cam follower arms 45*a* and 45*b* and the extendable and retractable members 51. As shown in the lower side of FIG. 3, platform overlap is at a maximum, i.e., the platforms have been decelerated to their slowest rate of relative movement, when the platforms move under the exit comb plates 28. As a result, in this region the cams 47*a* and 47*b* are at their greatest distance away from the centerline of the path-of-travel of the platforms, and the length of the extendable and retractable member 51** between adjacent platforms is at a minimum. It is immediately after this region is reached that the platforms are accelerated to achieve separation. After acceleration, the platform speed remains constant until the entrance comb plate region is approached. When this region is reached the platforms are rejoined and slightly decelerated, as hereinafter described in more detail.

In order to achieve the necessary acceleration and deceleration of the platforms in the change-of-direction regions and still maintain the necessary alignment, it has been found that only the lateral position of the inner cam **47*a* can be changed. Thus, as shown in FIG. 3, only the inner cam 47*a* moves toward and away from the centerline of the path-of-travel in the change-of-direction regions. The outer cam 47*b* remains a constant distance from the centerline of the path-of-travel through the change-of-direction regions. The cam follower mounted on the outer end of the outer cam follower arm 45*b* impinging on the outer cam 47*b* forms a mechanical stop that maintains the extendable and retractable member 51 taut so that the platforms in this region are suitably aligned. While only one of the cam follower arms, namely the inner cam follower arm 45*a***, moves toward and away from the centerline of the path-of-travel in the change-of-direction regions, such movement adequately accelerates and decelerates the platforms.

To summarize, the inner cam follower arm **45*a* moves toward and away from the centerline of the path-of-travel and the outer cam follower arm 45*b*** remains a fixed distance from the centerline of the path-of-travel of the platforms in the change-of-direction regions. As a result, a slight amount of acceleration and deceleration occurs (separated by a constant speed in the area where the actual change of direction takes place), whereby the platforms are separated and rejoin.

With respect to platform rejoining, after the platforms have been turned (through 180° as shown in FIG. 3), the roller/slides 69 leave the semicircular section 75 and enter the linear section 73 of the guide rail that lies under the entrance comb plate 27. As noted above, the guide rail steadily declines to point "P" in this section. See FIG. 7. The sloping portion of the guide rail 65 gradually lowers the trailing edges of the platforms while the platforms are separated. At point "P", the platforms are oriented so that support for the trailing edge of each platform may be readily shifted from the support arm 67 to the platforms as the platforms region. This load transfer is effectuated by a hump 77 in the tracks 49 that raises the leading edges of the platforms until the leading edges contact and support adjacent preceding platforms. More specifically, as the trailing edge of a particular platform approaches point "P" in the guide rail 65, the wheels of that platform start to move up the hump 77. The incline in the hump 77 is gradual so as to not place an undue strain on the extendable and retractable member 51. At the top of the hump 77, an upward extending cap 55 affixed to the leading edge of the climbing platform contacts and supports the adjacent preceding platform. Adjacent platforms are now rejoined, and support for the trailing edge of the adjacent preceding platform has now been shifted from its support arm 67 to the wheels of the trailing platform, via the cap 55. The initial declining section of hump 77 is shaped so that continuous contact is maintained between the leading edge of each platform and the lower surface of the adjacent preceding platform until at least two (2) platforms are in such contact. In the preferred embodiment, the initial declining section of hump 77 is convexly contoured. The convexly contoured surface has a curvature approximately equal to the curvature of one platform. The platforms are rejoined prior to their being decelerated (see FIG. 3) in order to minimize the number of preceding overlapping platforms overlying a particular platform when the platforms rejoin. This arrangement permits the support arm 67 of each platform to support only the trailing edge of its corresponding platform while the platforms are separated, and minimizes the number of overlaid, overlapping platforms, and therefore the amount of weight, that must be supported by the leading edges of the platforms when adjacent platforms are rejoined.

After the aforementioned initial decline, hump 77 may decline more rapidly whereby the caps no longer support the preceding platforms. In this region, the roller/slides 69 leave the linear section 73 of the guide rail 65. Preferably, deceleration of the platforms start when the wheels of the platforms approach the end of the hump 77, and finishes when the wheels are in the level section of track 49. As noted above, deceleration is created by the inner cam 47*a* being forced to move away from the centerline of the path-of-travel of the platforms. Just prior to reaching the tip of the entrance comb plate 24*a*, the cams 47*a* and 47*b* are equidistant from the centerline of the platform path-of-travel, whereby platform overlap is at a maximum.

In summary, the trailing edge of each platform includes a combed flap that meshes with the upper surface of the following platform. When the platforms change direction, the trailing edges of the platforms are supported by the guide rail 65. Immediately after the guide rail starts to support the trailing edge of a platform, the platform is accelerated slightly, whereby it is separated from the following platform. The platforms remain separated through the change-of-direction regions. After the desired change-of-direction has been accomplished, the platforms are realigned and decelerated.

While the illustrated embodiment of the invention is one wherein the change-of-direction regions are 180° change-of-direction regions, it will be appreciated that, if desired, a 90° or some other angle change-of-direction regions could be formed in the same manner. For example, rather than the linear regions of the path of travel lying parallel to one another in a single corridor, the path-of-travel could define a substantially rectangular loop extending through several corridors. Such a loop would require four change-of-directions, regions all with an angle of 90°. Alternatively, the path of the travel of the platforms could be T-shaped, or take on some other configuration whereby 180° change-of-directions, as well as 90° change-of-directions (or some other angle) could be required. The only change in the change-of-direction structure required is to change the semicircular region 75 of the guide rail 65 to something other than a semicircle. For example, if a 90° change-of-direction is required, the semicircular section would be replaced by a quarter circle section. In all such cases, of course, the change-of-direction regions would be preceded by a deceleration zone and followed by an acceleration zone.

A preferred embodiment of platforms formed in accordance with the invention are illustrated in FIGS. 8–16 and hereinafter described. As previously discussed, the platforms are designed to minimize surface irregularities between platforms and at the tips of the entrance and exit comb plates 28 and 27. In order to accomplish this result, the flaps 63 are tapered so that a continuous, substantially flat, surface is presented to passengers or freight in all movement zones and at the entrance and exit comb plates. The average taper angle of the flap 63 (i.e., the featheredge angle subtended by the top and bottom surfaces of the flap) is dependent upon the angle of inclination of the platforms and in particular the angle of inclination of the stacked platforms in the region of the comb plates, since this is the region where passengers and freight enter or leave the moving walkway and, thus, is the region where a continuous substantially flat surface is of most importance. In this regard, if the declination of the longitudinal chord of the convexly contoured pallets is approximately 10° near the entrance and exit comb plates, the taper angle of the flaps is approximately 10°.

Figure 8:
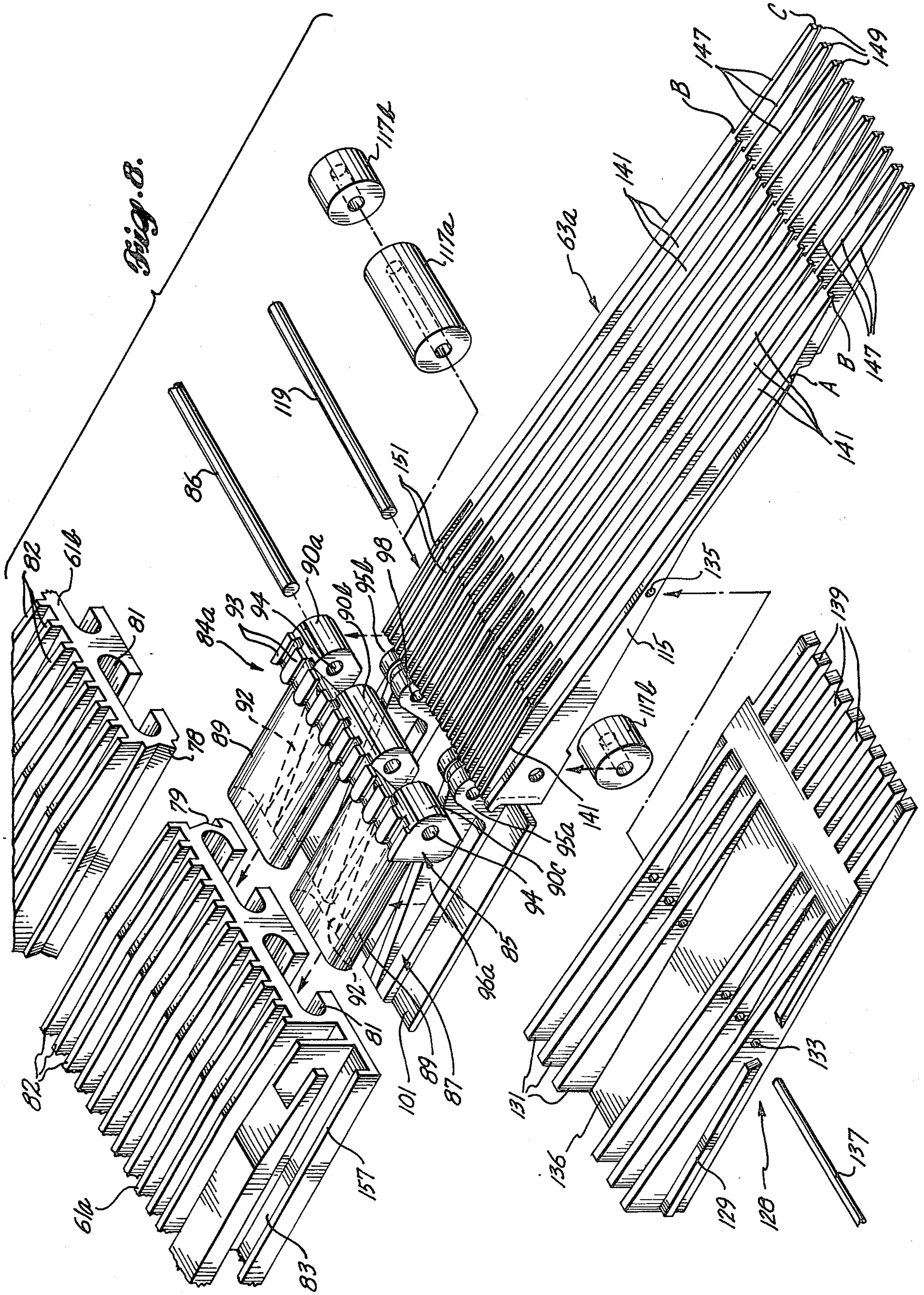
FIG. 8 is a enlarged, exploded isometric view of a portion of the trailing edge of a platform.

As best illustrated in FIG. 8, each pallet 61 comprises a plurality of elongate segments 61*a*, 61*b*, etc.—six (6), for example. While a plurality of pallet segments form each pallet, only two pallet segments are illustrated in FIG. 8. These two pallet segments include an outer segment 61*a* and an inner segment 61*b*. Although not shown in the drawings, the outer segments (61*a* for example) are half as wide as the inner segments (61*b* for example). The other inner pallet segments are identical to the one shown; and, the other outer pallet segment is the mirror image of the one shown.

The adjacent longitudinal edges of the two pallet segments shown 61*a* and 61*b* abut one another. Formed in one of the abutting edges, namely the abutting edge of the inner pallet segment 61*b* is an elongate, cross-sectionally Σ-shaped protrusion 78. Formed in the abutting edge of the outer pallet segment 61*a* is a Σ-shaped cavity 79. The Σ-shaped cavity 79 is positioned and sized to receive the Σ-shaped protrusion 78 formed in the inner pallet section 61*b*. After being joined together, the inner and outer pallet segments are affixed by a weld joint 80 that lies along the longitudinal lower corner of the abutting pallet sections. See FIG. 9. Thus, the pallet sections are permanently joined together.

Figure 17:
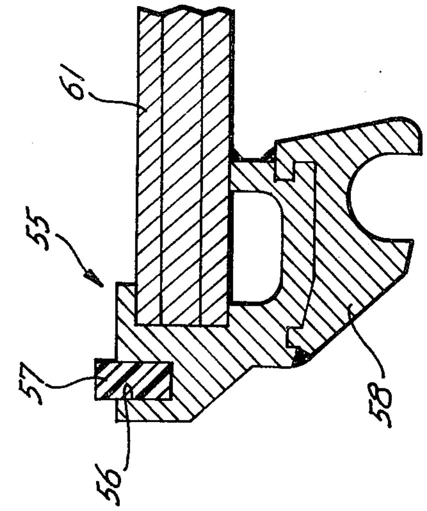
FIG. 17 is a cross-sectional view of the leading edge of a platform pallet; and, FIG. 18 is a partial, transverse cross-sectional view of a guide rail supporting a roller-slide block located on the end of a platform support arm, all formed in accordance with the invention.

Each pallet segment 61*a* and 61*b* is longitudinally spanned, from its leading edge to its trailing edge, by parallel T-shaped apertures 81 (two apertures 81 in the outer segment 61*a* and four apertures 81 in the inner segment 61*b*). The legs of the T-shaped apertures 81 open into the bottom surface of the pallet segments. The apertures are included to reduce the weight of the pallets so that less force is required to move the platforms and to receive the hinge assemblies hereinafter described. As previously noted, the upper surfaces of the pallets are combed, i.e., each pallet segment includes a plurality of parallel, raised comb teeth 82 that span the segment from front to rear. The trailing ends of the pallet comb teeth are tapered. The outer edge of the outer pallet segment 61*a* includes an elongate cavity 83 adapted to receive the leg of the support arm 67 that parallels the outer edge of the platforms and to receive an extension from the side walls of the hand rail assembly to create a seal between the platforms and the handrail side walls and prevent pinching or catching of passengers or thin clothing between the two surfaces. The manner of mounting the support arm 67 in the cavity is illustrated in FIG. 17 and described in more detail below.

Each flap 63 comprises a plurality of independently movable sections 63*a*, 63*b*, etc.—10 (ten) for example. Each flap section is equal in width to one-half the width of the inner pallet segments 61*b*, etc. Further, each flap section 63*a* is rotatably attached to the trailing edge of a pallet segment 61*a* by a hinge assembly 84*a* which also has a width equal to one-half the width of the inner pallet segment. Thus, six pallet segments, and ten (10) flap sections and hinge assemblies form one platform. (Since the flap sections and the hinge assemblies are identical, only one hinge assembly 65*a* and one flap section 63*a* are illustrated in FIG. 8. Further, in order for a complete flap section to be shown, the flap section illustrated in FIG. 8 is shifted to the right, i.e., it is misaligned with its related pallet segment 61*a*).

Figure 10:
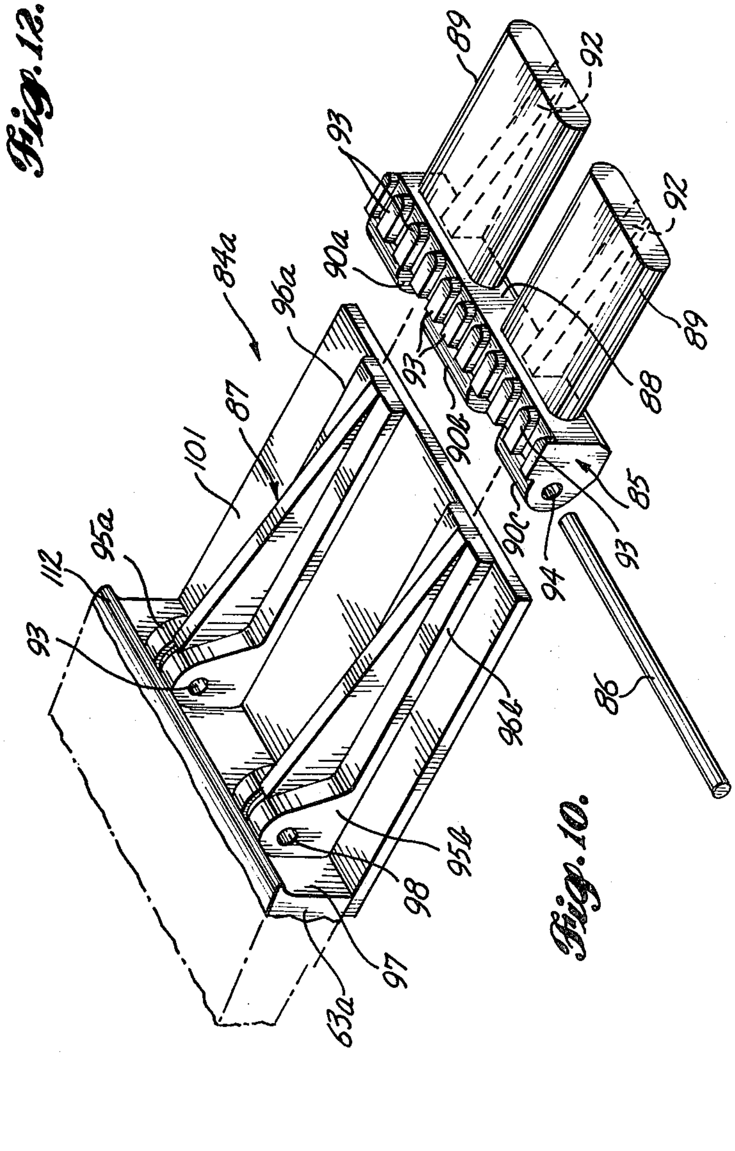
FIG. 10 is an enlarged, exploded isometric view of a hinge assembly for attaching a flap section of a pallet.
Figure 13:
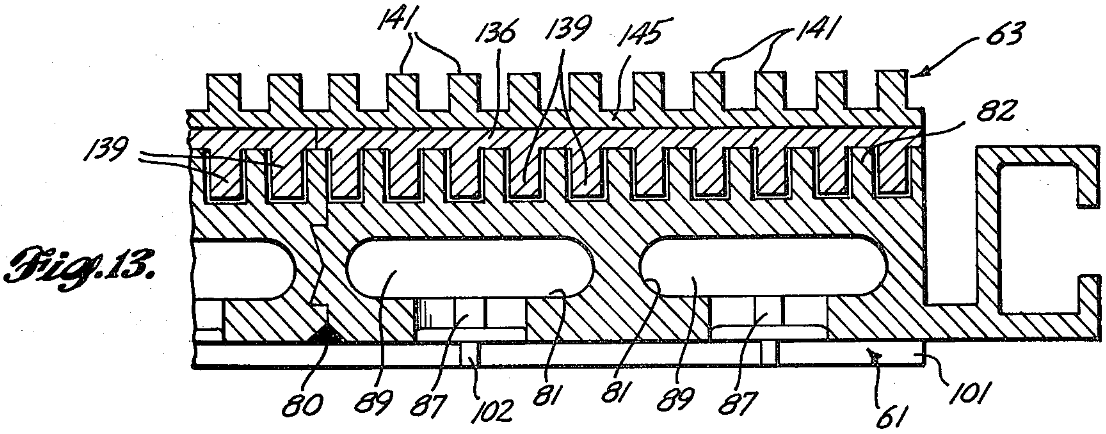
FIG. 13 is a partial, transverse, cross-sectional view taken along lines 13—13 of FIG. 12.
Figure 14:
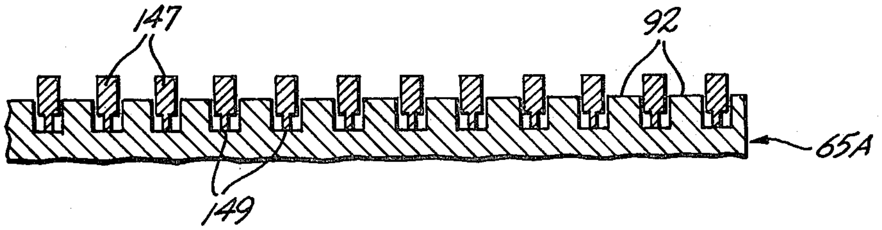
FIG. 14 is a partial transverse, cross-sectional view taken along lines 14—14 of FIG. 12.
Figure 15:
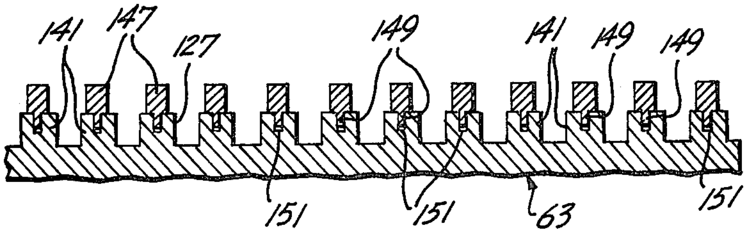
FIG. 15 is a partial, transverse, cross-sectional view taken along lines 15—15 of FIG. 12.

As best shown in FIGS. 8 and 10, each hinge assembly 84*a* includes: a first hinge block 85; a hinge pin 86; and, a second hinge block 87. As will be better understood from the following discussion, the first hinge block 85 is affixed to the related pallet segment and the second hinge block 87 is integral with the leading edge of the related flap section.

Figure 12:
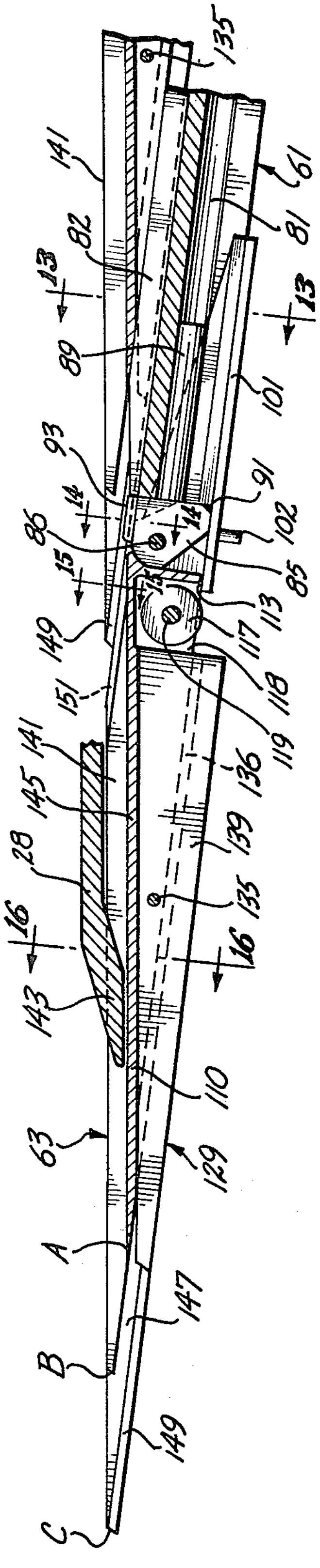
FIG. 12 is a partial, transverse, cross-sectional view of a flap overlapping a pallet.

As best seen in FIG. 10, the first hinge block 85 is an integral structure that includes an elongate body 88, a pair of arms 89 and three hubs or nodes 90*a*, 90*b* and 90*c*. The arms 89 both project outwardly from the same side of the elongate body 88. This side of the body faces the trailing edge of the related pallet segment 61*a*, as shown in FIG. 8. The position, cross-sectional configuration and size of the arms 89 are such that they snugly slide into the cross-member of the T-shaped apertures 81, formed in the pallet segment and previously described. When the arms 89 are fully inserted into the cross-members of the T-shaped apertures 81, the side of the body 78 from which the arms project abuts the trailing edge of the related pallet segment 61*a*. After inserting the arms into these apertures, the first hinge block is affixed to the related pallet segment by a weld joint 91 located along the lower corners of the abutting members, as shown in FIG. 12.

Centrally formed in the bottom surface of each arm 89 and extending into the elongate body 88 of the first hinge block is an elongate, wedge-shaped cavity 92. The pointed ends or tip of the wedge-shaped cavities 92 are located at the outer lower tip of the related arms 89. The cavity 92 receives the legs of T-shape wings 96*a* and 96*b*, which are affixed to the flap 63.

Figure 11:
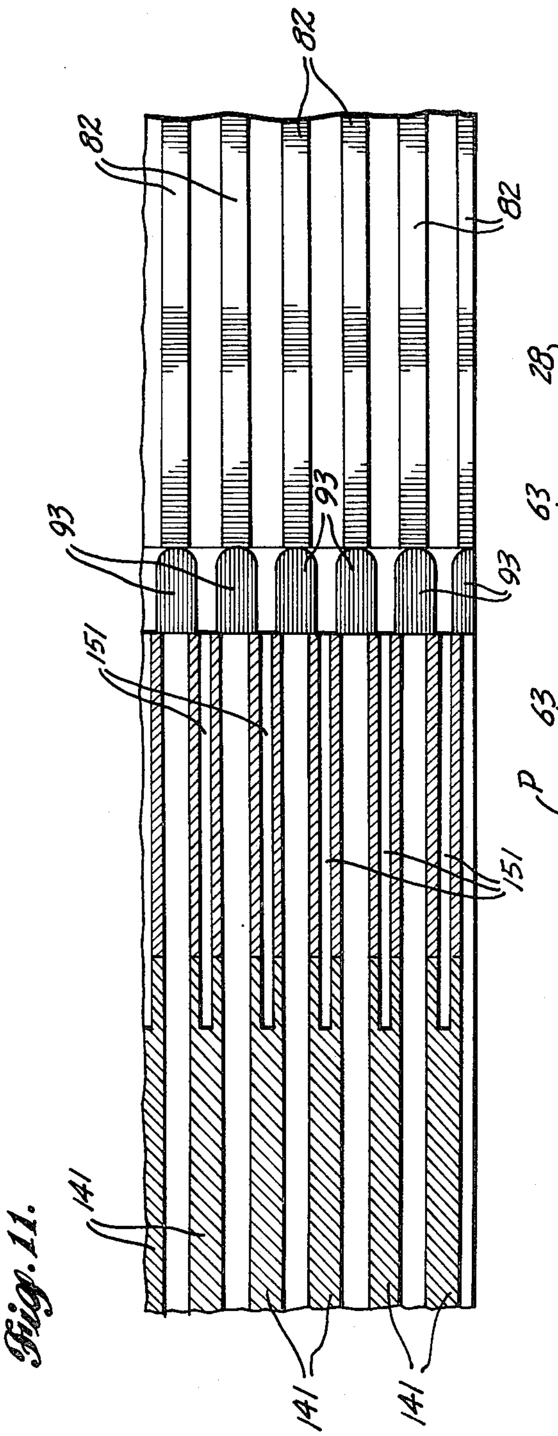
FIG. 11 is a partial, top plan view of a pallet, flap and hinge assembly.

A plurality of alignment comb teeth 93 are formed in the upper surface of the body 88 of the first hinge block 85. The alignment comb teeth 93 are arrayed side-by-side and parallel to the path of travel of the platforms. The number of alignment comb teeth equals the number of pallet comb teeth and related teeth are aligned with one another, as shown in FIG. 11. While equal and aligned, the width of the alignment comb teeth 93 is greater than the width of the pallet comb teeth 82. The depth of the recesses between the alignment comb teeth is equal to the depth of the recesses between the pallet comb teeth at the end of the taper region of the pallet comb teeth. Furthermore, the leading edge of the alignment comb teeth is curved so that a smooth surface flows into the recesses between the alignment comb teeth. As will be better understood from the following discussion, the sizing and positioning of the alignment comb teeth in this manner causes comb teeth formed in the lower surface of the flaps to be precisely positioned with respect to comb teeth formed in the upper surface of the flaps.

The nodes 90*a*, 90*b* and 90*c* of the first hinge block 85 extend outwardly from the side of the elongate body 88 of the first hinge block opposed to the side from which the arms 89 project. The nodes 90*a*, 90*b* and 90*c* are spaced apart. The spaces between adjacent nodes are longitudinally, centrally aligned with the wedge-shaped cavities 92 formed in the arms 89. Further, the spaces between the nodes 90*a*, 90*b* and 90*c* of the first hinge block 85 are sized and positioned to receive the nodes of the second hinge block 87, hereinafter described in more detail. Hinge pin holes 94, adapted to receive the hinge pin 86, extend through the nodes 90*a*, 90*b* and 90*c*, along a longitudinal axis that lies transverse to the direction of travel of the moving walkway, but in the plane of the path of travel. The alignment comb teeth 93 terminate along a line lying directly above the axis of the pin holes 94, as shown in FIG. 12. Further, the upper rearward surface 91 of each node, 90*a*, 90*b* and 90*c* is convexly curved through an angle of approximately 100° starting from beneath the line defining the terminating end of the alignment comb teeth 93. Then, the rear surface of the nodes tapers inwardly toward the elongate body 88. Additionally, the spaces between the nodes are concavely curved so as to receive the nodes of the second hinge block 87, which are convexly curved.

As noted above, and as best seen in FIG. 10, the second hinge block 87 is integral with the related flap section 63*a*. The second hinge block 87 of each hinge assembly comprises two elements each of which includes a node and a tapered, inverted T-shaped wings. Thus, the second hinge block comprises: first and second nodes 95*a* and 95*b* and, first and second tapered, inverted, T-shaped wings 96*a* and 96*b*. The first and second nodes 95*a* and 95*b* are formed integrally with and project forwardly from the leading end 97 of the flap section 63*a*. A tapered, inverted, T-shaped wing 96*a* and 96*b* is integrally formed with each of the nodes 95*a* and 95*b*. The tapered, inverted, T-shaped wings lie parallel to the longitudinal axis of the flap sections. Each tapered, inverted, T-shaped wing includes a lower cross-member and a vertical legs. The vertical legs taper, as the legs recede from the nodes, toward the cross-members. The lower surfaces of the cross-members are coplanar with the lower surfaces of the pallets when the pallets and the flaps are assembled as herein described.

As noted above, the outer surfaces of the nodes 95*a* and 95*b* of the second hinge block 87 are convexly curved. The size and curvature of the nodes of the second hinge block 87 are such that the nodes can be mounted in the spaces between the nodes 90*a*, 90*b* and 90*c* of the first hinge block 85. Further, pin holes 98 extend through the nodes of the second hinge blocks 87, in alignment with the pin holes 94 formed in the nodes of the first hinge block 85. The hinge pin 86, thus, extends through the nodes of the second hinge block, as well as through the nodes of the first hinge block. In this manner, the associated flap section 63*a* is rotatably affixed on the rear end of the related pallet segment 61*a*.

The legs of the T-shaped wings 96*a* and 96*b* are shaped and positioned so as to fit within the wedge-shaped cavities 92 formed in the arms 89 of the first hinge block; and, the cross-members of the T-shaped wings are shaped to fit into the leg of the T-shaped cavity of the associated pallet segment 61*a* when the arms 89 are positioned in the T-shaped cavities.

Bonded to the lower surface of the inverted, tapered, T-shaped wings is a pallet separation member such as slide plate 101. The slide plate 101 is formed of a low friction material (e.g., ultrahigh molecular weight polyethylene) and extends from a point slightly behind the leading end 97 of the flap section 63*a* to the outer end of the T-shaped wings. The slide plate is equal in width to the width of a flap section.

When the hinge assembly is assembled by attaching the nodes of the hinge elements together by running the hinge pin through the pin holes in the assembled nodes, the trailing edge of the flap sections are free to rise upwardly (clockwise as viewed in FIG. 12). However, the trailing edge is not free to drop downwardly. Rather declination of the trailing edge of the flap sections is controlled by the coaction of the inverted, tapered, T-shaped wings of the wedge-shaped cavities in the arms 89 in which they lie. More specifically, the upper surface of the legs of the T-shaped wings 96*a* and 96*b* abut the upper surfaces of the wedge-shaped cavities 92, when the pallet is raised so as to allow the trailing edge of the flaps to fall. Thus, as the pallets are raised when the support arms 67 are supported by a guide rail and the associated platform is accelerated the trailing edge of the flap is prevented from dropping. Further flap support is provided by the cross member of the T-shaped wings impinging on the bottom of the arms 89 of the first hinge block 85 and by the upper surface of the slide block 101 impinging on the lower surface of the related pallet segment.

While the trailing edge of the flap sections are free to rotate in an upward direction when considered alone, such rotation is limited when the flap sections impinge on the upper surface of an immediately following platform. More specifically, the slide plates 101 ride on the upper surface of the immediately following platform. As a result, upward movement of the trailing edge of the flap sections, as the flaps slide back and forth on the upper surface of the pallet during acceleration and deceleration of the walkway, is restricted. The flap sections of a preceding platform are rotatable enough to allow the trailing edge of the flap sections to maintain comb contact with the pallet, as hereinafter discussed in more detail. Such contact is enhanced because the flap sections are independent of each other, as opposed to being affixed together as are the pallet segments.

Projecting orthogonally downwardly from the bottom surface of the wings 95*a* and 95*b* through openings in each slide plate 101 are two steel pins 102. The pins 102 are pressed into holes in wings and positioned and sized so as to slide in the recesses between the pallet comb teeth of the succeeding pallet. The pins are included to assist the hereinafter described meshing between pallet teeth and flap teeth to prevent lateral movement between flap sections and the pallet on which the flap sections ride.

As best illustrated in FIG. 8, the flap sections are generally tapered elements having an upper surface, a lower surface, a leading end and a trailing edge. As previously discussed, the nodes of the second hinge block 87 are integral with (or fixed to) the leading end of the flap section. Further, as best seen in FIG. 10, the upper corner 112 of the leading end of the flap sections is arcuately contoured so as to overlie the curved upper surfaces of the nodes 90*a*, 90*b* and 90*c* of the first hinge block 85 when the hinge blocks are pinned together.

Formed in the lower surface of each flap section 63*a* is a generally wedge shaped cavity 110. See FIG. 12. The cavity is actually defined by the leading end wall 113 and the sidewalls 115 of the flap sections. Antifriction rollers 117 are mounted in the front portion of the cavities 110 formed in the flap elements 63*a*. More specifically, a relatively wide inner roller 117*a* and a pair of relatively narrow outer rollers 117*b* are mounted in the front portion of the cavity 110. The rollers are separated by webs 118 and are rotatably mounted on a pin 119 that passes through the sidewalls 115 and the webs 118 of the flap elements. The webs 118 extend to the tip of the wedge-shaped cavity. The lower outer periphery of the rollers 117*a* and 117*b* lies coplanar with or slightly below, the lower surface of the slide plate 101.

Figure 16:
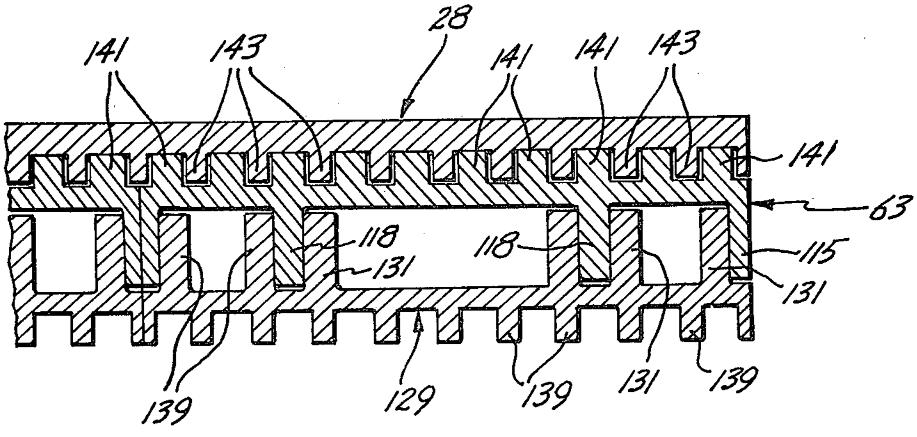
FIG. 16 is a partial, transverse, cross-sectional view taken along lines 16—16 of FIG. 12.

Also mounted in the cavity 110 is a tapered antifriction comb block 129, best seen in FIG. 8. The tapered comb block 129 includes a series of longitudinally wedge-shaped upwardly extending webs 131, which face the top of the wedge-shaped aperture 110 in the flap element. A series of aligned holes 133 extend through the webs 131 in a direction transverse to the direction of platform movement. The web holes 133 are aligned with holes 135 formed in the sides 115 of the flap sections. A connecting pin 137 passes through the holes in the sides 115 and the holes in the webs when the comb block 129 is mounted in the cavity 110, rearwardly of the antifriction rollers 117. The upwardly extending webs 131, of course, are positioned so as not to conflict with the webs 118 formed in the cavity 110 as seen in FIG. 16.

Formed in the bottom of the comb block 129 are a plurality of parallel, downwardly extending comb teeth 139. The comb teeth lie parallel to the longitudinal axis of the flap section; and, are positioned and shaped to mesh with the comb teeth 82, formed in the upper surface of the pallet. The meshing between the comb block teeth and the pallet teeth maintains lateral alignment between the flap sections and the pallets that the flap sections overlap, without preventing the flap sections from moving fore and aft. The comb block 129 is composed of a low friction material (e.g. ultrahigh molecular weight polyethylene) and therefore acts as an antifriction bearing block between adjacent platforms.

It will be appreciated from the foregoing discussion of the comb block 129 that, the comb block, in essence, comprises a horizontal plate 136 that supports a plurality of upwardly extending webs 131 and a plurality of downwardly extending comb teeth 139. The lower surface of the horizontal plate 136 is coplanar with the lower surface of the slide plate 101. As a result, the bottoms (actually the tops) of the recesses between the comb block comb teeth 139 are coplanar with the lower surface of the slide plate 101.

The upper surface of the flap sections 63*a* are covered by upper flap comb teeth 141 arrayed in side-by-side relationship, parallel to the longitudinal axis of the flap section. The upper flap comb teeth 141 are centrally aligned with, and have a width equal to, the voids between the pallet comb teeth 82, as best seen in FIG. 11. In addtion, the upper flap comb teeth are adapted to mesh with comb teeth 143 formed in the tips of the entrance and exit comb plates 28 and 27 as illustrated best in FIG. 16.

Referring now to FIGS. 8 and 12, the sides 115 of the flaps taper to a featheredge lying along a line designated A. The web 145 that defines the bottom of the recesses between the upper flap comb teeth 121 (this same web defines the top of the wedge-shaped cavity 110 in the flap sections) also ends at line A. The upper flap comb teeth 141, extend rearward of point A and taper to a second featheredge lying along a line designated B. Extending downwardly from, and integral with, the bottom surface of each of the teeth forming the upper flap comb teeth 141 are lower flap comb teeth 147. The lower flap comb teeth 147 only extend down from the upper flap comb teeth in the region where the upper flap teeth extend beyond the web 145. Further, the lower flap comb teeth 147 are narrower than the upper flap comb teeth as clearly shown in FIG. 8. The width of the lower flap comb teeth 123 is substantially equal to the width of the recesses between the alignment comb teeth 93 formed in the first hinge block 85. The lower flap comb teeth taper to a further featheredge lying along a line designated C. Line C defines the terminating end of the overall flap section.

The bottom surface of each lower flap comb tooth 147 is undercut along its longitudinal lower corners. The resulting undercut comb teeth 149 have a width smaller than the width of the lower flap comb teeth 147. The width of the undercut comb teeth is slightly less than the width of recesses 151 formed in the leading end of the frame comb teeth 141. More specifically, as best seen in FIG. 8, the upper flap comb teeth 141 are cut off such that a plateau is formed near the leading end of the flap section. Formed in each upper flap tooth, in the plateau region, as best seen in FIGS. 8 and 11 is a recess 151. The undercut comb teeth 149 mesh with these recesses 151, when one flap overlaps the next flap, which occurs when the platforms are in the regions of the exit and entrance comb plates. As a result, an aligned, continuously combed surface is created at the entrance and exit comb plates. More specifically, since the flap sections of one platform overlap the flat sections of another platform in the regions of the comb plates, as shown in FIG. 12, only the upper flap comb teeth 141 are exposed. As previously noted, the upper flap comb teeth 141 mesh with the comb teeth 143 formed in the tips of the entrance and exit comb plates 28 and 27. Moreover, the upper surfaces of the flap sections are flat. Further, the upper surfaces of the flap sections are horizontal because their taper angle is the same as the declination of the platforms. As a result, passengers or freight entering the moving walkway (or leaving the moving walkway) are presented with a continuously combed, flat, horizontal surface.

As illustrated in FIG. 12, the lower surface of the undercut comb teeth are coplanar with the lower surface of the comb teeth 139 formed in the bottom of the comb block 129. In addition, these teeth are longitudinally aligned. Hence, when the comb block comb teeth mesh with the pallet comb teeth, which occurs as the amount of platform overlap decreases, the lower surface of the undercut comb teeth, as well as the lower surface of the comb block comb teeth ride on the bottom of the recesses formed between the pallet comb teeth.

In summary, during acceleration, platform overlap decreases. As a result, passengers or freight, which are initially riding only on the flaps, start to ride on the upper surfaces of the pallets 61. As platform overlap decreases, and this action takes place, the undercut teeth 149 move out of the recesses 151 in the upper flap comb teeth 141 and the lower flap comb teeth 147 mesh with the pallet comb teeth 82. The comb block comb teeth 139 continue to mesh with the pallet comb teeth 82. As a result, the weight of passengers or freight is gradually shifted from the flaps to the flaps and the pallets. The inclined trailing end of the pallet comb teeth 82 assist in providing a smooth transition of objects between the upper surfaces of the pallet 61 and the flap of the preceding platform, as overlap changes.

During deceleration, platform overlap is increased and adjacent flaps 63 move toward each other. As a result, the weight of freight or passengers is gradually shifted from the flaps and the pallets back to the flaps alone. A smooth transition of this weight shift is effected by the various combs. Specifically, as the flaps approach one another, the lower flap comb teeth 147 slide between the pallet comb teeth 82 and gradually move the freight or passengers onto the upper surface of the flap comb teeth 141. The inclined trailing end of the pallet comb teeth 82 assures that a smooth transfer takes place. As deceleration continues and the platforms approach an exit comb plate 28, the lower flap comb teeth 147 mesh with the alignment comb teeth 93. The curved front edges of the alignment comb teeth guide the lower flap comb teeth into the recesses between the alignment flap comb teeth. As a result, the undercut flap comb teeth 149 are aligned with the recesses 151 in the plateau region of the flap comb teeth 141. At some point prior to the edge of the exit comb plate 28 being reached, adjacent flaps overlap and a continuously combed, flap upper surface is created that meshes with the teeth 143 formed in the tip of the exit comb plate.

As illustrated in FIG. 7, the cap 55 that is affixed to the leading edge of each pallet 61 extends rearwardly a predetermined distance therefrom and abuts against the platform's upper and lower surfaces. The cap 55 is welded or otherwise suitably rigidly affixed to the lower surface of the pallet and to a support 58 that lies atop the axle on which the wheels 43 are mounted. The rear edge of the cap is a stop that limits forward movement of an adjacent preceding flap in the deceleration and constant speed zones when it impinges on the leading edge of the slide plate 101 of the overlapping platform.

An upwardly opening cavity 56 is formed in the cap 55 and snugly receives an insert 57. The insert 57 projects upwardly from the opening in the cavity and has a height above the upper surface of the pallet approximately equal to or less than the thickness of slide plate 101. It is the upper surface of the insert 57 that receives the weight of preceding platforms as separated adjacent platforms are rejoined in the change-of-direction regions. The insert 57 does not otherwise interact with adjacent platforms.

FIG. 18 illustrates a preferred embodiment of a guide rail 65 and a roller/slide 69 formed in accordance with the invention. The illustrated guide rail 65 has a U-shaped cross section. The outer wall of the guide rail is attached at selected points to a vertical support wall 153 by bolts 155, for example. The inner surface of the guide rail is coated with a suitable low friction polymeric material, such as polytetrafluoroethylene.

As previously noted, one leg of the support arm 67 associated with a particular platform is mounted in an elongate cavity 83 formed in the outer edge of the outer pallet sections. The elongate cavity may be square in cross-sectional shape and accessible via a slot 157 running the length of the outer edge of the pallet. The leg of the support arm is inserted into the elongate cavity and held in place by bolts 159 accessible through the slot 157, as shown in FIG. 18.

The preferred form of the roller/slide 69 comprises a shaft 161 mounted on the outer end of the arm 67. The shaft 161 projects downwardly from the outer end of arm 67 and is angled laterally toward the platform, transverse to the path of the guide rail 65, forming an angle $\beta$ with the horizontal lower surface of the support arm 67. In the preferred embodiment of this invention angle $\eta$ is approximately 75°. A roller/slide 161 is rotatably mounted on the shaft 161 by bearings 165. The roller/slide is formed of a low friction material and has curved lower corners and a lower surface that allows the roller/slide to slide, as well as roll in the guide rail. Starting from its curved lower corners, the roller/slide 69 defines a truncated cone which narrows upwardly. The sides of the truncated cone form an angle with its base approximately equal to angle $\beta$. Preferably, a collar 167 is located between roller/slide 163 and the support arm 67. The outer diameter of the roller/slide 69 is less than the distance between the walls of the guide rail, whereby the roller/slide normally freely rolls on the bottom and outer side of the guide rail while supporting the axial and radial loads of its corresponding platform trailing edge in the change-of-direction regions.

In summary, the invention provides a new and improved accelerating and decelerating moving walkway. The platforms of the moving walkway are formed such that minimal walkway surface irregularities occur. Minimal surface irregularity is provided by convexly forming the pallets and by including flaps that are rotatable along an axis lying in the plane of travel, but transverse to the path of travel. Such rotation allows the flaps to follow the curved surface of a following platform, as the flaps are moved back and forth over the surface of that flap platform, without the trailing edge of the flaps rising above the upper surface of the overlapped platform. In addition, the use of flaps that mesh with an overlapped platform prevents lateral misalignment from occurring. Platform change-of-direction is provided by a mechanism adapted to support the trailing edge of the platforms so that they can be disengaged. Coacting with the mechanism for supporting the trailing edge of the flaps is the mechanism for controlling the acceleration and the deceleration of the platforms and the vertical height of the tracks on which the platforms ride.

While a preferred embodiment of the invention has been illustrated and described, various changes can be made therein without departing from the spirit and scope of the invention. For example, rather than being independently movable, the flap sections can be affixed together if desired. Further, different comb meshing systems can be used. Hence, the invention can be practiced otherwise than as specifically described herein.

The embodiments of the invention is which an exclusive property or privilege is claimed are defined as follows:

1. In an accelerating and decelerating moving walkway that includes a plurality of overlapping platforms driven along a substantially horizontal path-of-travel that includes linear regions joined by change-of-direction regions, said platforms having leading edges and trailing edges, said accelerating and decelerating moving walkway also including an overlapping control means for controlling the relative acceleration and deceleration of the walkway by controlling the amount of overlap between adjacent platforms as the platforms are driven along said substantially horizontal path-of-travel, the improvement comprising change-of-direction means, located in the change-of-direction regions, for separating, turning and bringing together adjacent platforms, said change-of-direction means including:

support means for supporting the trailing edge of said platforms in said change-of-direction regions as said adjacent platforms are separated, turned and brought back together; and, accelerating and decelerating means forming part of said overlapping control means for accelerating said platforms in said change-of-direction regions to separate adjacent platforms and for decelerating said platforms in said change-of-direction regions to bring adjacent platforms together.

2. The improvement claimed in claim 1:

(a) wherein said support means comprises:

(1) a guide rail surrounding said change-of-direction regions, said guide rail gradually lowering the trailing edge of each of said plurality of platforms as said platforms are separated;

(2) a support arm affixed to the trailing edge of each of said platforms, said support arms coacting with said guide rail such that said guide rail supports said support arms, and, thus, the trailing edge of said platforms as said platforms are separated; and, (b) including weight transfer means for raising the leading edge of each of said plurality of platforms to shift support of said trailing edge of each of said separated platforms from said support means to said platforms, wherein said plurality of platforms are rejoined prior to deceleration in said change-of-direction regions.

3. The improvement claimed in claim 2 wherein:

said guide rail comprises a U-shaped channel surrounding said change-of-direction regions; and, said support means also includes a plurality of roller/-slides, one of said roller/slides mounted on the outer end of each of said support arms and adapted to enter into and be supported by said U-shaped channel in said change-of-direction regions.

4. The improvement claimed in claim 2 wherein said platforms include meshing means that mesh in said linear regions of said path-of-travel and wherein said change-of-direction means disengage said meshing means in said change-of-direction regions.

5. The improvement claimed in claim 4 wherein said improvement further comprises improved platforms, said improved platforms being convexly contoured upwardly from their leading edges to their trailing edges.

6. The improvement claimed in claim 5 wherein each of said improved platforms comprises a pallet and a trailing edge flap, each trailing edge flap being hinged to its associated pallet such that said flap is vertically movable.

7. The improvement claimed in claim 1 wherein said platforms include meshing means that mesh in said linear regions of said path-of-travel and wherein said support means support the trailing edge of said platforms so as to disengage said meshing means in said change-of-direction regions.

8. The improvement claimed in claim 1 wherein said improvement further comprises improved platforms, said improved platforms being convexly contoured upwardly from their leading edges of their trailing edges.

9. The improvement claimed in claim 7 wherein said improvement further comprises improved platforms, each of said improved platforms comprising a pallet and a trailing edge flap each trailing edge flap being hinged to its associated pallet such that said flap is vertically movable.

10. The improvement claimed in claim 6 or 9 wherein downward rotational movement of said flap is prevented after said flap reaches a predetermined orientation relative to pallet.

11. The improvement claimed in claim 10 wheren said flap includes an arm extension member underlying said pallet.

12. The improvement claimed in claim 11 wherein said arm extension member operably communicates with the upper surface of an adjacent succeeding platform to inhibit upward rotation of said flap away from the upper surface of said adjacent succeeding platform.

13. The improvement claimed in claim 6 or 9 wherein said improvement further comprises improved meshing means, said improved meshing means comprising pallet combs formed in the upper surface of said pallets and lower flap combs formed in the lower surface of said flaps, said combs formed such that the teeth of said pallet and flap combs of adjacent platforms mesh when said platforms are in said linear regions of said path of travel.

14. The improvement claimed in claim 13 wherein said improvement further comprises:

entrance and exit comb plates covering the ends of the linear regions of said path-of-travel, said entrance and exit comb plates including downwardly extending teeth;

controlling the amount of overlap of said platforms when said platforms pass beneath said entrance and exit comb plates such that only the upper surfaces of said flaps are exposed; and, configuring the upper surfaces of said flaps so that a continuous, substantially planar surface is formed when said platforms pass beneath said entrance and exit comb plates, said upper surfaces including upper flap combs formed such that their teeth mesh with said downwardly projecting teeth of said entrance and exit comb plates.

15. The improvement claimed in claim 14 including hinge assemblies for attaching said flaps to said pallets, the upper surface of said hinge assemblies including alignment combs for aligning the teeth of said lower flap combs with the teeth of said upper flap combs.

16. The improvement claimed in claim 15 including recesses formed in the teeth of said upper flap combs adjacent to said hinge assemblies and wherein the teeth of said lower flap comb are undercut so as to mesh with the recesses formed in the teeth of said upper flap combs.

17. The improvement claimed in claim 16 wherein each of said flaps is formed of a plurality of flap segments located side-by-side and independently hinged by said hinge means to an associated pallet.

18. An accelerating and decelerating moving walkway comprising:

(A) a plurality of overlapping platforms, each of said platforms comprising:

(1) a pallet having a leading edge and a trailing edge and being longitudinally convexly contoured upwardly from said leading edge to said trailing edge;

(2) a flap, said flap being tapered and having a leading edge and a trailing feather edge; and, (3) a hinge assembly for attaching the leading edge of said flap to the trailing edge of said pallet so that said flap can rotate about an axis lying substantially in the plane of said pallet and parallel to the trailing edge of said pallet, said hinge assembly including an arm extension member rigidly connected to said flap and underlying said pallet, said arm extension member preventing downward rotational movement of said flap after said flap reaches a predetermined orientation relative to said pallet and being capable of supporting said flap in said predetermined orientation, said arm extension member operably communicating with the supper surface of an adjacent succeeding platform to prevent upper rotation of said flap away from the upper surface of said adjacent succeeding platform;

said platforms overlapping one another such that one platform supports the trailing edge of the preceding platform;

(B) overlap control means for controlling the amount of overlap between adjacent platforms of said plurality of platforms;

(C) drive means coupled to said plurality of platforms for moving said plurality of platforms; and, (D) path of travel defining means for defining the path of travel of said platforms, said path of travel defining means including at least two linear regions and at least two change-of-direction regions connecting said linear regions, each of said linear regions including an acceleration zone, a constant speed zone and a deceleration zone, said path of travel defining means including change-of-direction means comprising:

(1) a guide rail surrounding each of said change-of-direction regions; and, (2) a support arm affixed to the outer edge of each pallet adjacent the trailing edge thereof, said support arms adapted to be supported by said guide rails in said change-of-direction regions.

19. An accelerating and decelerating moving walkway as claimed in claim 18 wherein said overlapping control means causes said platforms to: (1) accelerate slightly and, thus, separate in the region where said platforms enter said change-of-direction regions; and, (2) decelerate slightly and, thus, rejoin in the region where said platforms leave said change-of-direction regions.

20. An accelerating and decelerating moving walkway as claimed in claims 19 including covers for covering said change-of-direction regions, said covers including an entrance plate where said platforms enter said change-of-direction regions and an exit plate where said platforms leave said change-of-direction regions.

21. An accelerating and decelerating moving walkway as claimed in claim 20 wherein the upper surface of said pallets, hinge assemblies and flaps are combed; and, wherein the lower surface of said flaps are combed, all of said combs being elongate and having a longitudinal axis that parallels the direction of movement of said platforms.

22. An accelerating and decelerating moving walkway as claimed in claim 21 wherein:

said platforms overlap such that only the upper surface of said flaps are exposed at the tips of said entry and exit regions; and, the tips of said entrance and exit comb plates have downwardly projecting teeth positioned so as to mesh with the combed upper surface of said flaps, said flaps being configured to present a continuous, substantially planar upper surface when said flaps mesh with said entrance and exit comb plates.

23. An accelerating and decelerating moving platform as claimed in claim 22 wherein the combed lower surface of said flaps mesh with the combed upper surface of said pallets in said linear regions of said path of travel.

24. A platform for a moving walkway formed of overlapping platforms comprising:

a pallet including a leading edge and a trailing edge and meshing means formed in the upper surface of said pallet, said meshing means of said pallet comprising pallet comb teeth formed in the upper furface of said pallet and extending from the leading edge of said pallet to the trailing edge of said pallet;

a flap having a leading edge and a tapered trailing edge, a first meshing means formed in the upper surface of said flap and a second meshing means formed in the lower surface of said flap, said first meshing means of said flap comprising comb teeth formed in the upper surface of said flap extending from the leading edge of said flap to the trailing edge of said flap, said comb teeth formed in the upper surface of said flap being aligned with the recesses formed between said pallet comb teeth, said comb teeth formed in the upper surface of said flap including recesses, said second meshing means of said flap comprising comb teeth formed in the lower surface of said flap extending from adjacent the leading edge of said flap to the trailing edge of said flap, said comb teeth formed in the lower surface of said flap and being aligned with the comb teeth formed in the upper surface of said flap adapted to mesh with said pallet comb teeth when two adjacent platforms overlap one another, said comb teeth formed in the lower surface of said flap including undercut teeth located along their longitudinal edges, said undercut teeth being positioned so as to be alignable with the recesses formed in the comb teeth formed in the upper surface of said flap; and, hinge means for rotatably attaching the leading edge of said flap to the trailing edge of said pallet along an axis lying parallel to the trailing edge of said pallet, including alignment comb teeth formed in the upper surface of said hinge means for aligning said undercut teeth with said recesses in the comb teeth formed in the upper surface of said flap.

25. A platform as claimed in claim 24 wherein said lap is formed of a plurality of independently movable ections, each of which is independently attached to the railing edge of said pallet so as to lie side-by-side.

26. A platform as claimed in claim 24 wherein said lap is formed of a plurality of independently moveable ections, each of which is independently attached to the railing edge of said pallet so as to lie side-by-side.

27. An accelerating and decelerating moving walkway as claimed in claim 19 wherein said path of travel means includes weight transfer means for raising the leading edge of each of said plurality of platforms to shift support of the trailing edge of each separated platform from said guide rail and said support arm to said platforms.

28. An accelerating and decelerating moving walkway as claimed in claim 27 wherein said guide rail gradually lowers the trailing edge of each of said plurality of platforms when said platforms are separated in said change-of-direction regions and said platforms are rejoined prior to being decelerated slightly.

29. An accelerating and decelerating moving walkway as claimed in claim 28 including covers for covering said change-of-direction regions, said covers including an entrance plate where said platforms enter said change-of-direction regions and an exit plate where said platforms leave said change-of-direction regions.

30. An accelerating and decelerating moving walkway as claimed in claim 29 wherein the upper surface of said pallets, hinge assemblies and flaps are combed; and, wherein the lower surface of said flaps are combed, all of said combs being elongate and having a longitudinal axis that parallels the direction of movement of said platforms.

31. An accelerating and decelerating moving walkway as claimed in claim 30 wherein:

said platforms overlap such that only the upper surface of said flaps are exposed at the tips of said entry and exit regions; and, the tips of said entrance and exit comb plates have downwardly projecting teeth positioned so as to mesh with the combed upper surface of said flaps, said flaps being configured to present a continuous, substantially planar upper surface when said flaps mesh with said entrance and exit comb plates.

32. An accelerating and decelerating moving platform as claimed in claim 31 wherein the combed lower surface of said flaps mesh with the combed upper surface of said pallets in said linear regions of said path-of-travel.

* * * * *